(12) United States Patent
He

(10) Patent No.: US 10,716,995 B2
(45) Date of Patent: *Jul. 21, 2020

(54) INFORMATION PROCESSING METHOD AND APPARATUS, STORAGE MEDIUM, AND ELECTRONIC DEVICE

(71) Applicant: NETEASE (HANGZHOU) NETWORK CO., LTD., Zhejiang (CN)

(72) Inventor: Zhaoda He, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,030

(22) Filed: Aug. 21, 2018

(65) Prior Publication Data

US 2019/0060745 A1 Feb. 28, 2019

(30) Foreign Application Priority Data

Aug. 22, 2017 (CN) .......................... 2017 1 0722730

(51) Int. Cl.
*A63F 13/00* (2014.01)
*A63F 13/2145* (2014.01)
(Continued)

(52) U.S. Cl.
CPC .......... *A63F 13/2145* (2014.09); *A63F 13/52* (2014.09); *A63F 13/5255* (2014.09);
(Continued)

(58) Field of Classification Search
None
See application file for complete search history.

(56) References Cited

U.S. PATENT DOCUMENTS

2007/0238529 A1* 10/2007 Iwamoto ................. H04W 4/60
463/42
2011/0256912 A1* 10/2011 Baynes ................. A63F 13/803
463/6
(Continued)

FOREIGN PATENT DOCUMENTS

CN 105094345 A 11/2015
CN 105597310 A 5/2016
(Continued)

OTHER PUBLICATIONS

Search report of CN Priority application No. 201710722730.6 filed on Aug. 22, 2017, dated Jun. 26, 2018.

Primary Examiner — Paul A D'Agostino
(74) Attorney, Agent, or Firm — Gang Yu

(57) ABSTRACT

An information processing method is provided. The method includes: a first touch area on a graphical user interface is provided, and a virtual character is configured to move in a game scene according to a first touch operation received in the first touch area; a second touch operation is detected acting on a mini-map, and a presentation content of the game scene is changed according to the second touch operation; when a signal triggering operation acting on a signal icon is detected in a process of changing the presentation content of the game scene according to the second touch operation, a prompt signal corresponding to the signal icon is sent, the prompt signal including position indication information of the game scene; and when the end of the second touch operation is detected, the presentation content of the game scene is controlled to be restored to a presentation content state before the second touch operation is detected.

18 Claims, 2 Drawing Sheets

(51) Int. Cl.
  *A63F 13/5372*  (2014.01)
  *A63F 13/52*    (2014.01)
  *A63F 13/847*   (2014.01)
  *A63F 13/5378*  (2014.01)
  *A63F 13/92*    (2014.01)
  *A63F 13/5255*  (2014.01)
  *H04L 29/06*    (2006.01)

(52) U.S. Cl.
  CPC ...... *A63F 13/5372* (2014.09); *A63F 13/5378* (2014.09); *A63F 13/847* (2014.09); *A63F 13/92* (2014.09); *H04L 67/38* (2013.01)

(56) References Cited

U.S. PATENT DOCUMENTS

| 2013/0127980 | A1* | 5/2013 | Haddick | G06F 3/013 |
| | | | | 348/14.08 |
| 2014/0191977 | A1* | 7/2014 | Feng | G06F 3/018 |
| | | | | 345/173 |
| 2014/0243089 | A1* | 8/2014 | Tsukioka | A63F 13/12 |
| | | | | 463/31 |
| 2014/0245367 | A1* | 8/2014 | Sasaki | H04N 21/4402 |
| | | | | 725/109 |
| 2016/0059131 | A1* | 3/2016 | Ye | A63F 13/537 |
| | | | | 463/31 |

FOREIGN PATENT DOCUMENTS

| CN | 105760076 A | 7/2016 |
| CN | 106959812 A | 7/2017 |
| CN | 106975219 A | 7/2017 |

* cited by examiner

INFORMATION PROCESSING METHOD AND APPARATUS, STORAGE MEDIUM, AND ELECTRONIC DEVICE

The present disclosure claims priority of Chinese Patent Application No. 201710722730.6, filed on Aug. 22, 2017 and named after "Information Processing Method and Apparatus, Storage Medium, and Electronic Device". Contents of the present disclosure are hereby incorporated by reference in entirety of the Chinese Patent Application.

TECHNICAL FIELD

The present disclosure relates to the technical field of computer interaction, and in particular to an information processing method and apparatus, a storage medium, and an electronic device.

BACKGROUND

With development of intelligent mobile terminals and game industry, a lot of mobile games with different themes emerge to meet requirements of players. Multiple players in groups for battle in games may be a core gameplay for many mobile games. For example, the core gameplay for Multi-player Online Battle Arena (MOBA) mobile games is 5V5 group battle. In a process of players in groups for battle in a game, communication and cooperation among the players are crucial. Therefore, whether a convenient and rapid interaction mechanism can be provided for communication of players or not is an important influencing factor on player experiences in such a type of mobile games.

SUMMARY

At least some embodiments of present disclosure provide an information processing method and apparatus, a storage medium, and an electronic device.

In one embodiment of the present disclosure, an information processing method is applied to a mobile terminal having at least one processor for executing a software application and a touch screen which is rendered with a graphical user interface, contents presented on the graphical user interface including a game scene, a virtual character, a mini-map, and at least one signal icon. The method includes that:

providing a first touch area on the graphical user interface, and configuring the virtual character to move in the game scene according to a first touch operation in the first touch area; detecting a second touch operation acting on the mini-map, and changing a presentation content of the game scene according to the second touch operation; when a signal triggering operation acting on a signal icon is detected in a process of changing the presentation content of the game scene according to the second touch operation, sending a prompt signal corresponding to the signal icon, the prompt signal including position indication information of the game scene; and when the end of the second touch operation is detected, controlling the presentation content of the game scene to be restored to a presentation content state before the second touch operation is detected.

In another embodiment of the present disclosure, an information processing apparatus is also applied to a mobile terminal having at least one processor for executing a software application and a touch screen which is rendered with a graphical user interface, contents presented on the graphical user interface including a game scene, a virtual character, a mini-map, and at least one signal icon. The apparatus includes: a first interaction component, configured to provide a first touch area on the graphical user interface, and configure the virtual character to move in the game scene according to a first touch operation received in the first touch area; a second interaction component, configured to detect a second touch operation acting on the mini-map, and change a presentation content of the game scene according to the second touch operation; a first detection component, configured to send, when a signal triggering operation acting on the signal icon is detected in a process of changing the presentation content of the game scene according to the second touch operation, a prompt signal corresponding to the signal icon, the prompt signal including position indication information of the game scene; and a second detection component, configured to control, when the end of the second touch operation is detected, the presentation content of the game scene to be restored to a presentation content state before the second touch operation is detected.

In another embodiment of the present disclosure, a computer-readable storage medium is also provided, on which at least one computer program may be stored, and the at least one computer program may be executed by at least one processor to implement the information processing method.

In another embodiment of the present disclosure, an electronic device is also provided. The electronic device includes: at least one processor; and at least one memory, configured to store at least one executable instruction of the processor, and the at least one processor is configured to execute the information processing method by executing the at least one executable instruction.

DETAILED DESCRIPTION

Figure 1:
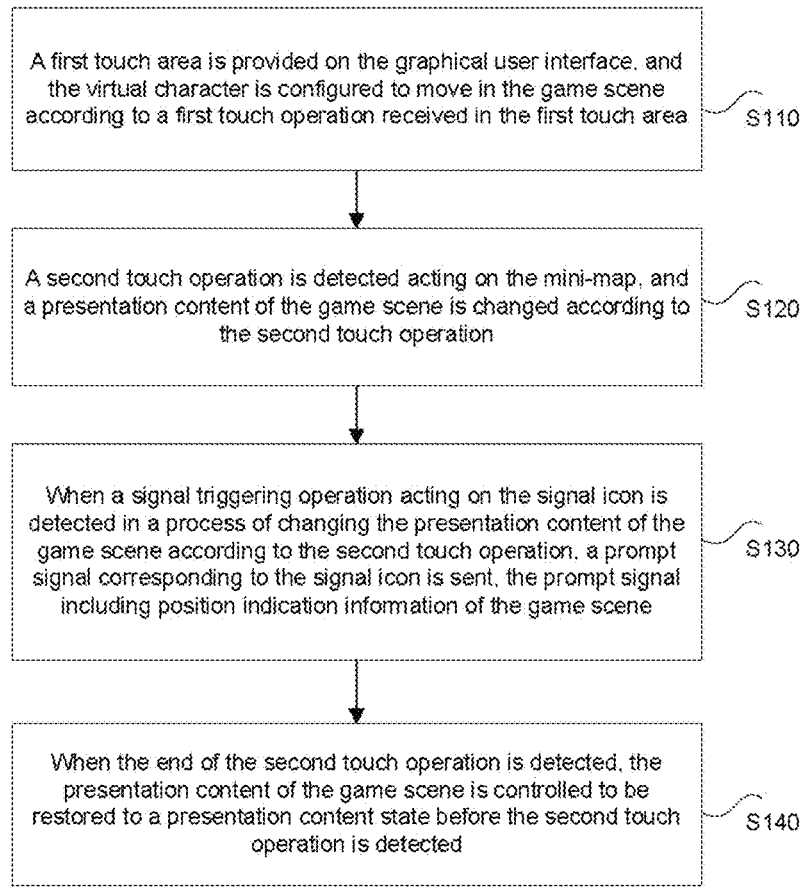
FIG. 1 is a flowchart of an information processing method according to an embodiment of the present disclosure.

Example embodiments will now be described more fully with reference to the accompanying drawings. However, example embodiments can be implemented in various forms and should not be construed as being limited to the embodiments set forth herein. Rather, these embodiments are provided so that the present disclosure will be thorough and complete, and the concept of the example embodiments will be fully transferred to those skilled in the art. The features, structures, or characteristics described may be combined in any suitable manner in one or more embodiments. In the following description, numerous specific details are provided to provide a thorough understanding of the embodiments of the present disclosure. However, those skilled in the art will recognize that the technical solutions of the present disclosure may be practiced without one or more of the specific details, or that other methods, elements, materials, apparatuses, steps, etc. may be employed. In other cases, well-known technical solutions are not shown or described in detail to avoid obscuring aspects of the present disclosure.

Moreover, the drawings are merely schematic illustrations of the present disclosure and are not necessarily drawn to scale. The same reference numerals in the drawings denote the same or similar parts, and thus a repeated description thereof will be omitted.

In the related art, a human-computer interaction designed for players to send a communication signal mainly includes one of the following manners.

In a first manner, the communication signal is sent in a text input manner. Since text input may interrupt an operation in a game, this manner is just suitable for a player in a non-battle state.

In a second manner, a preset signal is sent by providing a specific control. For example, a gather signal sending button is provided, and the gather signal sending button is configured for a player to send a gather prompt signal to the other allies. However, the player cannot autonomously select a position where the signal located in, so that it is impossible for the player to notify an exact gather position to the allies.

In a third manner, through detecting a click operation in a mini-map on a game screen, then a communication signal will be sent by the mobile terminal of the player. In such a manner, the player can autonomously select a position where the signal is located. However, the content of the signal is preset, the player cannot select a type (such as, gather, attack and retreat) of the signal, and the type of the signal is automatically selected according to an algorithm of a system, so that a selection result is likely to be inconsistent with a real intention of the player. In addition, a screen space of a mobile phone is relatively small, so that a position cannot be accurately selected from the mini-map in the game, and a mis-operation rate is high. If the mini-map is zoomed in to improve operation accuracy, a screen display area will be occupied, and the timely capture of battle information and game control of players are affected. For example, the zoomed-in mini-map will affect operations of the player on a virtual joystick.

In the present exemplary embodiment, an information processing method is applied to a mobile terminal having at least one processor for executing a software application and a touch screen which is rendered with a graphical user interface, contents presented on the graphical user interface including a game scene, a virtual character, a mini-map, and at least one signal icon. The information processing method may include the steps as follows.

At step S110, a first touch area is provided on the graphical user interface, and the virtual character is configured to move in the game scene according to a first touch operation received in the first touch area.

At step S120, a second touch operation is detected acting on the mini-map, and a presentation content of the game scene is changed according to the second touch operation.

At step S130, when a signal triggering operation acting on the signal icon is detected in a process of changing the presentation content of the game scene according to the second touch operation, a prompt signal corresponding to the signal icon is sent, the prompt signal including position indication information of the game scene.

At step S140, when the end of the second touch operation is detected, the presentation content of the game scene is controlled to be restored to a presentation content state before the second touch operation is detected.

The technical solution could achieve the following two technical effects. On the one hand, there is no need for players to input location information of a signal manually, and players can select signal position accurately on the mini-map without zooming in, so that the screen space would be saved, and interference on other operations would be reduced. On the other hand, a signal can be sent in a process of changing a view to observe a game situation, and the operation is incoherent. Moreover, a game view would be immediately restored after signal sending is completed. Therefore, interruption time for regular game operations of the player would be minimized.

In the following, the steps of the present exemplary embodiment will be further described.

At step S110, a first touch area is provided on the graphical user interface, and the virtual character is configured to move in the game scene according to a first touch operation received in the first touch area.

The first touch area may be, for example, a virtual joystick control area or a direction control virtual button area. The present exemplary embodiment is not specially limited.

In an alternative implementation manner, the first touch area is a virtual cross button area or a virtual D-PAD area. The virtual character is controlled to perform at least one of movement and turn around in the game scene according to the first touch operation in the virtual cross button area.

As an alternative embodiment, the first touch area is a visible area. For example, the first touch area may have a bounding box, the first touch area may rendered with color or predetermined transparency, or adopt other modes to distinguish the first touch area visually. The virtual character is controlled to perform at least one of movement and turn around in the game scene according to a touch operation such as sliding or clicking in the touch area. A visible area can be positioned quickly by players, and an operation difficulty of a game novice would be reduced.

As an alternative embodiment, the first touch area may be set as an invisible area on the graphical user interface. Thus the first touch area would not cover or affect the game screen, it can save the screen space and provide a better graphic effect. However, since the invisible touch area is hard to be sensed by a player, as an optional implementation solution, a visual guide control may be displayed in the first touch area. For example, when a virtual joystick is used as a direction control solution of a character, the virtual joystick may be displayed in the first touch area to visually guide the player.

Figure 2:
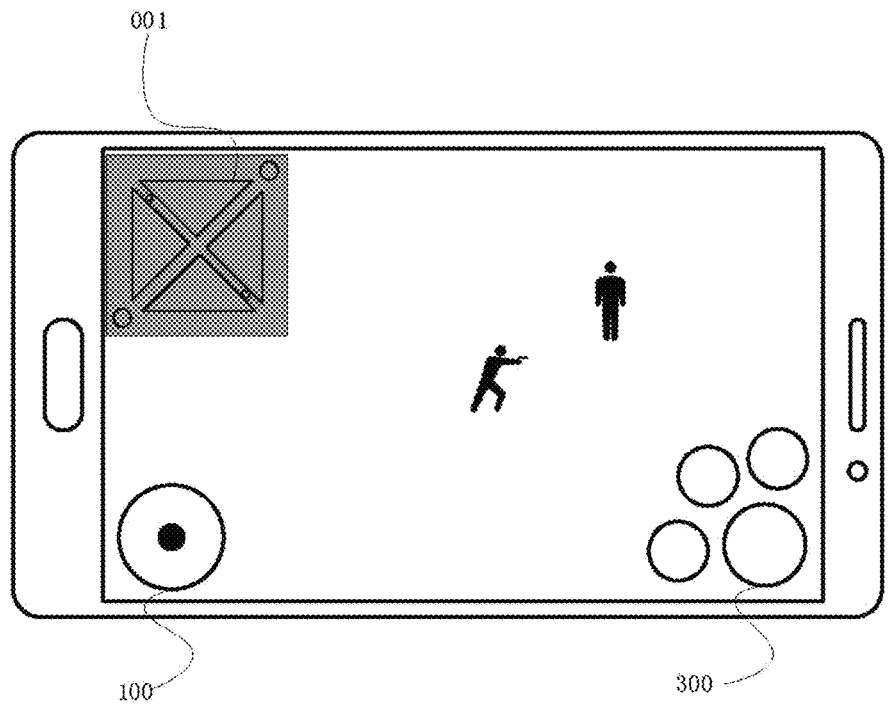
FIG. 2 is a schematic diagram of a graphical user interface according to an exemplary embodiment of the present disclosure.

In a specific embodiment shown in FIG. 2, the first touch area is a virtual joystick control area. The virtual joystick control area is located at a lower left of the graphical user interface. A virtual joystick 100 is displayed by default in the virtual joystick control area. The virtual character is controlled to move in the game scene according to the first touch operation in the virtual joystick control area. A plurality of skill controls 300 are provided at a lower right of the graphical user interface for providing the player with control functions of sending skills. In the present alternative embodiment, it is convenient to control the virtual character to move in the game scene by the left hand in the above operation manner, and to perform skill sending by controlling the skill controls by the right hand.

By providing the first touch area on the graphical user interface and detecting the first touch operation acting on the first touch area, the virtual character may move in the game scene according to the first touch operation in the first touch area.

At step S120, a second touch operation acting on the mini-map is detected, and a presentation content of the game scene is changed according to the second touch operation.

The second touch operation may be a touch sliding operation or a touch clicking operation.

Alternatively, a mini-map 001 is provided on the graphical user interface for displaying a panoramic map (or local map) of the game scene and important information in the game (e.g., the real-time position of at least one ally character, the real-time position of at least one enemy character, view information of the virtual character, etc.). A presentation content of the virtual character displayed on the graphical user interface is a local area of the game scene. The mini-map 001 may be a panoramic thumbnail of the game scene (as shown in FIG. 2), or may be a local thumbnail of the game scene.

Changes of the presentation content of the game scene displayed on the graphical user interface include at least one of changes of a presentation area and presentation angle of the game scene on the graphical user interface. Specifically, at least one of a position and angle of a virtual camera is changed according to a sliding track of the touch sliding operation.

In an alternative embodiment, when the presentation contents of the game scene on the graphical user interface is changed according to the second touch operation in the mini-map, at least one of an orientation of the virtual character and a position of a weapon crosshair cannot be changed due to the second touch operation.

The following describes, with an example, the change of the presentation content of the game scene on the graphical user interface.

At least one of the position and angle of the virtual camera in the game scene may be changed, according to a position of a touch point of the second touch operation, corresponding to the change of the presentation content displayed on the graphical user interface.

Figure 3:
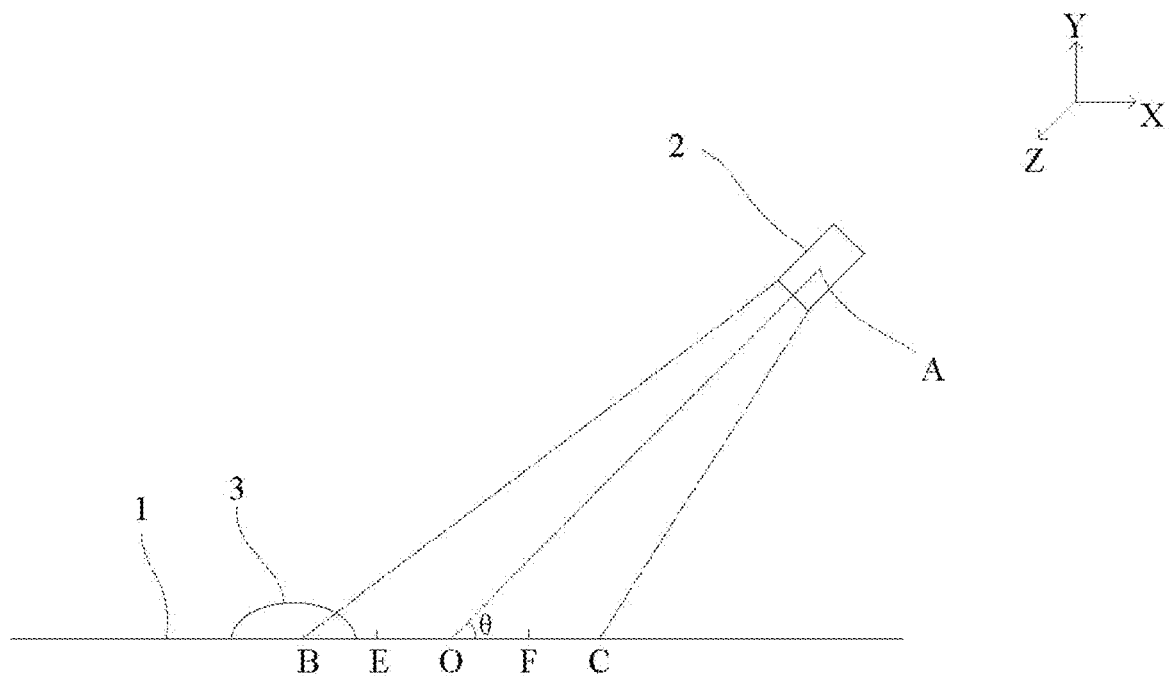
FIG. 3 is a schematic diagram of view control of a game scene according to an exemplary embodiment of the present disclosure.

FIG. 3 shows a cross-sectional view of a game scene. In an XY coordinate plane as shown in FIG. 3, a Z direction in this figure is an outward direction perpendicular to a screen surface (XY plane). A reference sign 1 represents a game scene, a reference sign 2 represents a virtual camera, and a reference sign 3 represents a hillside in the game scene. The virtual camera 2 is disposed at a point A, an angle of a capturing direction line OA is θ, and a point O is an intersection point of the capturing direction line and the game scene 1. Contents of the game scene rendered on the screen of a mobile terminal are equivalent to scene contents captured by the virtual camera 2, ranging from a point B to a point C. When at least one of a relative height between the virtual camera 2 and the game scene 1, the angle θ, the position of the virtual camera, the orientation of the capturing direction line OA, and other parameters of the virtual camera 2 are changed, a presentation area of the game scene on the graphical user interface will be changed. That is, the presentation content of the game scene is changed. For example, when the virtual camera 2 keeps a fixed value of the relative height to the game scene 1, if the position of the virtual camera 2 is moved or the virtual camera is rotated with a constant angle θ, a size of the game scene presentation area on the graphical user interface may be maintained, but a presentation position of the game scene on the graphical user interface is changed.

When the virtual camera 2 is moved toward or zoomed in to the game scene 1 along the capturing direction line AO, the presentation area of the game scene on the graphical user interface will become smaller, and the presentation angle will not change. On the contrary, the presentation area will become larger and the presentation angle will not change.

When the game scene is small, for example, the range of game scene is limited from a point E to a point F, within a certain capturing angle range, and the virtual camera 2 could capture the whole game scene. In this case, the position A of the virtual camera 2 is remain unchanged, when the capturing angle θ is changed within a certain range, the presentation angle of the game scene on the graphical user interface will be changed, but the presentation area will not be changed.

In an alternative implementation manner, preconditions may be set for displaying a mini-map. For example, a mini-map is provided on the graphical user interface when a preset touch operation acting on the graphical user interface is detected, wherein the preset touch may set as one of followings: re-press, long-press, and double-click, and the presentation content of the game scene on the graphical user interface is configured to be changed according to a second touch operation in the mini-map. In this way, a player can bring up the mini-map as required to avoid mis-operation and the screen space will be saved. For another example, in an optional implementation manner, at least one option is provided in settings of a game software application for the player to select, and a function of judging whether to provide the mini-map on the graphical user interface is achieved according to a content of a setting option.

It should be noted that there is no limitation in the order of the above steps S110 and S120.

At step S130, when a signal triggering operation acting on the signal icon is detected in a process of changing the presentation content of the game scene according to the second touch operation, a prompt signal corresponding to the signal icon is sent, the prompt signal including position indication information of the game scene.

The process of changing the presentation content of the game scene in the graphical user interface according to the second touch operation refers to a process from the start to the end of the second touch operation. For example, the second touch operation is a touch sliding operation. This process includes the process from the start to the end of the touch sliding operation (including at least one stationary touch point during the process from the start to the end of the touch sliding operation). For another example, the second touch operation is a touch clicking operation. This process includes the process from the start to the end of the touch clicking operation (namely a touch medium leaves a screen). In this process, when a signal triggering operation acting on the signal icon is detected, a prompt signal corresponding to the signal icon is sent, the prompt signal including the position indication information of the game scene.

Figure 4:
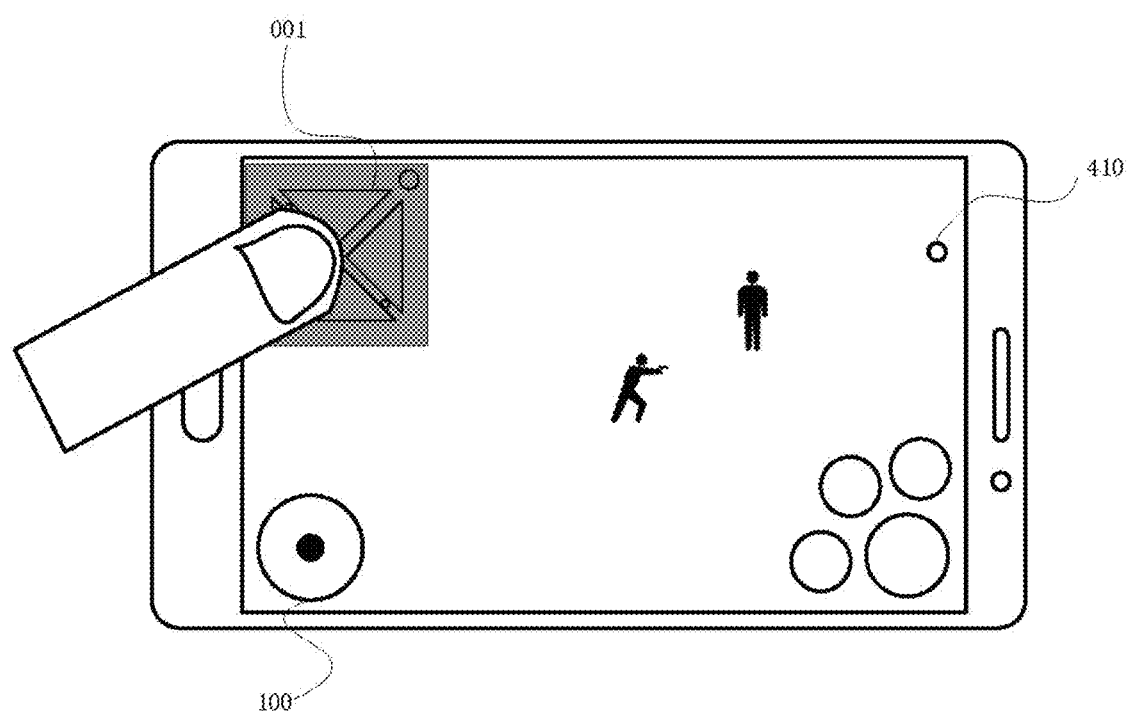
FIG. 4 is a schematic diagram of operation of a graphical user interface according to an exemplary embodiment of the present disclosure.

For example, the graphical user interface includes at least one signal icon (taking the signal icon 410 in FIG. 4 as an example). In the process that a game player touches a mini-map 001 by at least one finger to change the presentation content of the game scene on the graphical user interface, when a touch operation (for example, a finger of the player touches on the click icon 410) acting on the signal icon 410 in FIG. 4 is detected, a prompt signal (e.g., an attack or retreat prompt signal) corresponding to the signal icon is sent. The prompt signal includes the position indication information of the game scene.

The function of the prompt signal is used for prompting other players in the game (e.g., allies in a team of the game). Therefore, the prompt signal may be sent to allies through a game server, so that a corresponding signal is displayed on the game graphical user interface of each of the allies' device. Of course, corresponding signals may also be displayed on the game graphical user interfaces of all allies' or all players' devices.

One of the technical problems to be solved by the present disclosure is to provide an interaction mechanism, which is capable of sending position information without requiring a player to manually input the position information. Therefore, the prompt signal of the present disclosure includes the position indication information of the game scene. On the one hand, there is no need for players to input location information of a signal manually, and players can select signal position accurately on the mini-map without zooming in, so that the screen space would be saved, and the interference on other operations would be reduced. On the other hand, a signal can be sent in a process of changing a view to observe a game situation, and the operation is incoherent. Moreover, a game view can be immediately restored after signal sending is completed. Therefore, the interruption time for regular game operations of the player would be minimized. In an optional embodiment, a terminal, receiving the prompt signal, of the player identifies the corresponding position in the mini-map according to the position indication information, so that the player can intuitively determine the position indicated by the prompt signal through a visual indicator on a panoramic thumbnail of the game scene. The visual indicator may be a dynamic effect such as a flashing highlighting prompt. As an optional embodiment, after the terminal of the allies send the prompt signal, the position indicated by the prompt signal may also be identified in the mini-map, so that the player can obtain a good operation feedback.

In addition to the position indication information, the prompt signal may also include voice reminding information with an indicator, text reminding information with an indicator, or a reminding voice, a reminding text, and the like. For example, a reminding voice may be sent to terminals of other players (e.g., when a player selects "gather", audio information "gather" of voice reminding is sent to the terminals of other players). And voice reminding indication information may also be sent to the terminals of other players to indicate the terminals of other players to play the corresponding and pre-stored voice audio.

In an optional embodiment, the position indication information includes a first position and a second position corresponding to the first position, the first position is a position of a current touch point of the second touch operation in the area of the mini-map, and the second position is a position in the game scene.

For example, a position of a current touch point of a finger of a player in the area of a mini-map is a point A. According to a corresponding relationship between the mini-map and a game scene, a position point B in the game scene is determined. Position indication information of the game scene includes the position indication information of the point B. For another example, a position of a current touch point of a finger of a player in the area of a mini-map is a point A. According to a corresponding relationship between the mini-map and the game scene, a position point B in the game scene is determined. When the point B is located in a specific area C (e.g., a jungle C) in the game scene, the position indication information of the game scene includes the position indication information of the specific area C.

In an optional embodiment, the position indication information of the game scene includes position information of a current presentation content of the game scene on the graphical user interface. The current presentation content of the game scene on the graphical user interface will be changed along with the second touch operation. The position indication information of the game scene includes the position information of the current presentation content of the game scene on the graphical user interface. For example, the center position of the current presentation content is located at a point D in the game scene, and the position indication information of the game scene includes the position information of the point D in the game scene. For another example, the current position of the virtual camera corresponding to the presentation content is located at a point E, and an angle of the virtual camera is θ1, the position indication information of the game scene includes the position E of the virtual camera, and the angle θ1.

At step S140, when the end of the second touch operation is detected, the presentation content of the game scene is controlled to be restored to a presentation content state before the second touch operation is detected.

It should be noted that in the present disclosure, the step of controlling the presentation content to be restored to a state before the second touch operation includes one of the following: controlling the presentation content of the game scene to be restored to a presentation content before the second touch operation is detected; or, controlling the presentation content of the game scene to be restored to a presentation content calculated according to a presentation content calculation logic before the second touch operation is detected.

The step of controlling the presentation content of the game scene on the graphical user interface to be restored to a presentation content before the second touch operation is detected refers to absolutely restoring presentation content to a state before the second touch operation. That is, both an absolute position of the virtual camera of the game screen and an absolute angle or direction of the virtual camera are restored to the state before the second touch operation. For example, before the second touch operation is detected, the position of the virtual camera 2 is located at a point A in an absolute coordinates of the game scene, and a capturing direction is a direction vector AO, the presentation content is absolutely restored to the state before the second touch operation is detected based on the point A and the direction AO. That is, based on the position of the virtual camera in the absolute coordinates of the game scene and the capturing direction in the absolute coordinates before the second touch operation is detected, and the presentation content of the game scene on the graphical user interface is controlled.

The step of controlling the presentation content of the game scene on the graphical user interface to be restored to presentation content calculated according to a presentation content calculation logic before the second touch operation is detected refers to restoring the presentation content to a state before executing the second touch operation. For example, before the second touch operation is detected, the game calculates a view according to predetermined calculation logic (for example, the virtual camera is disposed at a head of a virtual character and rotates to follow the rotation of the virtual character). In such a case, in the present disclosure, the step of restoring the content to a state before the second touch operation is detected may also be restore by using a calculation logic before the second touch operation to calculate the content. For example, before the second touch operation is detected, the position of the virtual camera 2 is located at a point A (e.g., a point with distance W and height H behind the virtual character) in relative coordinates associated with the virtual character, and the capturing direction is a direction vector AO, which is associated with at least one of the orientation of the virtual character and the direction of the weapon crosshair (e.g., a projection orientation of the direction vector AO in a horizontal direction is the same as the orientation of the virtual character in the horizontal direction). During restoration, the position of the virtual camera 2 is still located at the point with distance W and height H behind the virtual character, and the capturing direction of the virtual camera 2 is associated with at least one of the orientation of the virtual character and the direction of the weapon crosshair. That is, the presentation content of the game scene on the graphical user interface is controlled according to the current position of the virtual character in the absolute coordinates of the game scene, at least one of the current orientation of the virtual character and the direction of the weapon crosshair of the virtual character, the positional relationship between the virtual camera in the game scene and the virtual character before the second touch operation is detected, and the relationship between at least one of the orientation of the virtual character and the direction of the weapon crosshair before the second touch operation is detected and the capturing direction of the virtual camera.

The scope claimed by at least some embodiments of the present disclosure should at least include the above two conditions.

It should be noted that the above-mentioned drawings are merely schematic illustrations of processes included in the method according to the exemplary embodiment of the present disclosure, and are not limiting purposes. It will be readily understood that the processes illustrated in the above figures do not indicate or limit the chronological order of these processes. In addition, it is also easily understood that these processes may be executed synchronously or asynchronously, for example, in multiple components.

In the present exemplary embodiment, an information processing apparatus is also applied to a mobile terminal having at least one processor for executing a software application and a touch screen which is rendered with a graphical user interface, contents rendered on the graphical user interface including a game scene, a virtual character, a mini-map, and at least one signal icon. The apparatus includes: a first interaction component, a second interaction component, a first detection component and a second detection component.

The first interaction component is configured to provide a first touch area on the graphical user interface, and configure the virtual character to move in the game scene according to a first touch operation received in the first touch area.

The second interaction component is configured to detect a second touch operation acting on the mini-map, and change a presentation content of the game scene according to the second touch operation.

The first detection component is configured to send, when a signal triggering operation acting on the signal icon is detected in a process of changing the presentation content of the game scene according to the second touch operation, a prompt signal corresponding to the signal icon, the prompt signal including position indication information of the game scene.

The second detection component is configured to control, when the end of the second touch operation is detected, the presentation content of the game scene to be restored to a presentation content state before executing the second touch operation.

The specific details of all components in the above apparatus have been described in detail in the corresponding information processing method, and therefore will not be described here.

It should be noted that although several components or elements of a device for action execution are mentioned in the above detailed description, such division is not mandatory. In fact, according to the implementation manners of the present disclosure, features and functions of two or more components or elements described above may be embodied in one component or element. Conversely, the features and functions of one component or element described above may be further divided into multiple components or elements.

In an exemplary embodiment of the present disclosure, there is also provided a computer-readable storage medium on which at least one computer program is stored, the at least one computer program being executed by at least one processor to implement the above information processing method.

The computer-readable storage medium may include a data signal propagated in baseband or as part of a carrier wave carrying at least one readable program code. Such propagated data signals may take a variety of forms, including but not limited to electromagnetic signals, optical signals, or any suitable combination of the above. The computer-readable storage medium may transmit, propagate, or transport a program for use by or in connection with an instruction execution system, apparatus, or device.

The at least one program code contained in the computer-readable storage medium may be transmitted using any suitable medium, including but not limited to wireless, wired, optical cable, radio frequency, etc., or any suitable combination of the above.

In an exemplary embodiment of the present disclosure, an electronic device is further provided. The electronic device includes a processing component, which may further include one or more processors, and a memory resource represented by a memory for storing at least one instruction executable by the processing component, such as at least one application program. The application stored in the memory may include one or more components each corresponding to a set of instructions. In addition, the processing component is configured to execute instructions to perform the above information processing method.

The electronic device may also include: a power supply component, configured to perform power management on the executed electronic device; a wired or wireless network interface, configured to connect the electronic device to a network; and an input output (I/O) interface. The electronic device may operate based on an operating system stored in a memory, such as Android, iOS, Windows Server, Mac OS X, Unix, Linux, FreeBSD, or the like.

Through the foregoing description of the implementation manners, those skilled in the art may easily understand that the exemplary implementation manners described herein may be implemented by software, and may also be implemented by software in combination with necessary hardware. Therefore, the technical solution according to the implementation manners of the present disclosure may be embodied in the form of a software product that may be stored in a non-volatile storage medium (which may be a CD-ROM, a U disk, a mobile hard disk, etc.) or on a network, including several instructions to make a computing device (which may be a personal computer, a server, an electronic device, or a network device, etc.) perform the method according to the implementation manners of the present disclosure.

Those skilled in the art will readily recognize other embodiments of the present disclosure after considering the specification and practicing the invention disclosed herein. This application is intended to cover any variations, uses, or adaptations of the present disclosure, and these variations, uses, or adaptations follow the general principles of the present disclosure and include any common knowledge or conventional techniques that are not disclosed in the technical field of the present disclosure. The specification and embodiments are to be considered exemplary, with the true scope and spirit of the present disclosure being indicated by the claims.

It should be understood that the present disclosure is not limited to the precise structure that has been described above and shown in the drawings, and various modifications and changes can be made without departing from the scope thereof. The scope of the present disclosure may be limited by attached claims.

What is claimed is:

1. An information processing method, applied to a mobile terminal having at least one processor for executing a software application and a touch screen which is rendered with a graphical user interface, contents presented on the graphical user interface comprising a game scene, a virtual character, a mini-map, and at least one signal icon, the method comprising:

provide a first touch area on the graphical user interface, and configuring the virtual character to move in the game scene according to a first touch operation received in the first touch area;

detecting a second touch operation acting on the mini-map, and changing a presentation content of the game scene according to the second touch operation;

when a signal triggering operation acting on a signal icon is detected in a process of changing the presentation content of the game scene according to the second touch operation, sending a prompt signal corresponding to the signal icon, the prompt signal comprising position indication information of the game scene; and when the end of the second touch operation is detected, controlling the presentation content of the game scene to be restored to a presentation content state before the second touch operation is detected.

2. The information processing method as claimed in claim 1, further comprising:

after sending the prompt signal, identifying a position in the mini-map, wherein the position is indicated by the position indication information in the game scene.

3. The information processing method as claimed in claim 1, further comprising:

when the prompt signal sent by other terminals is received, identifying a position in the mini-map, wherein the position is indicated by the position indication information in the game scene.

4. The information processing method as claimed in claim 1, wherein controlling the presentation content of the game scene to be restored to the presentation content state before the second touch operation is detected comprises one of the following:

controlling the presentation content of the game scene to be restored to a presentation content before the second touch operation is detected; and controlling the presentation content of the game scene to be restored to a presentation content calculated according to a presentation content calculation logic before the second touch operation is detected.

5. The information processing method as claimed in claim 1, wherein the prompt information further comprises at least one of the following: voice prompt information and text prompt information.

6. The method as claimed in claim 1, wherein changing the presentation content of the game scene according to the second touch operation when the second touch operation is a touch sliding operation comprises:

changing the presentation content of the game scene according to a sliding track of the touch sliding operation.

7. The method as claimed in claim 1, wherein the first touch area is one of the following: a virtual joystick control area and a direction control virtual button area.

8. The information processing method as claimed in claim 1, wherein changing the presentation content of the game scene according to the second touch operation comprises:

changing at least one of a position and an angle of a virtual camera in the game scene according to a position of a touch point of the second touch operation.

9. The information processing method as claimed in claim 8, wherein changing the presentation content of the game scene according to the second touch operation when the second touch operation is a touch sliding operation comprises:

changing at least one of the position and the angle of the virtual camera according to a touch sliding track of the touch sliding operation.

10. The information processing method as claimed in claim 1, wherein the position indication information comprises a first position and a second position corresponding to the first position, the first position is a position of a current touch point of the second touch operation in the area of the mini-map, and the second position is a position in the game scene.

11. The information processing method as claimed in claim 1, wherein the position indication information comprises position information of a current presentation content of the game scene.

12. An information processing apparatus, applied to a mobile terminal having at least one processor for executing a software application and a touch screen which is rendered with a graphical user interface, contents rendered on the graphical user interface comprising a game scene, a virtual character, a mini-map, and at least one signal icon, the apparatus comprising:

a first interaction component, configured to provide a first touch area on the graphical user interface, and configure the virtual character to move in the game scene according to a first touch operation received in the first touch area;

a second interaction component, configured to detect a second touch operation acting on the mini-map, and change a presentation content of the game scene according to the second touch operation;

a first detection component, configured to send, when a signal triggering operation acting on the signal icon is detected in a process of changing the presentation content of the game scene according to the second touch operation, a prompt signal corresponding to the signal icon, the prompt signal comprising position indication information of the game scene; and a second detection component, configured to control, when the end of the second touch operation is detected, the presentation content of the game scene to be restored to a presentation content state before the second touch operation is detected.

13. A computer-readable storage medium, on which at least one computer program is stored, wherein the at least one computer program is executed by at least one processor to implement the information processing method as claimed in claim 1.

14. An electronic device, comprising:
- at least one processor; and
- at least one memory, configured to store at least one executable instruction of the at least one processor,
- wherein the at least one processor is configured to execute the information processing method as claimed in claim 1 by executing the at least one executable instruction.

15. The information processing method as claimed in claim 2, further comprising:
- when at least one prompt signal sent by other terminals is received, identifying a position in the mini-map, wherein the position is indicated by the position indication information in the game scene.

16. The information processing method as claimed in claim 2, wherein controlling the presentation content of the game scene to be restored to the presentation content state before executing the second touch operation comprises one of the following:
- controlling the presentation content of the game scene to be restored to a presentation content before executing the second touch operation; and
- controlling the presentation content of the game scene to be restored to a presentation content calculated according to a presentation content calculation logic before executing the second touch operation.

17. The information processing method as claimed in claim 2, wherein the prompt information further comprises at least one of the following: voice prompt information and text prompt information.

18. The information processing method as claimed in claim 2, wherein the first touch area is one of the following:
- a touch area is a visible area; and
- a touch area is an invisible area but displaying a visual guide control in the invisible area.

* * * * *